United States Patent Office 3,177,788
Patented Apr. 13, 1965

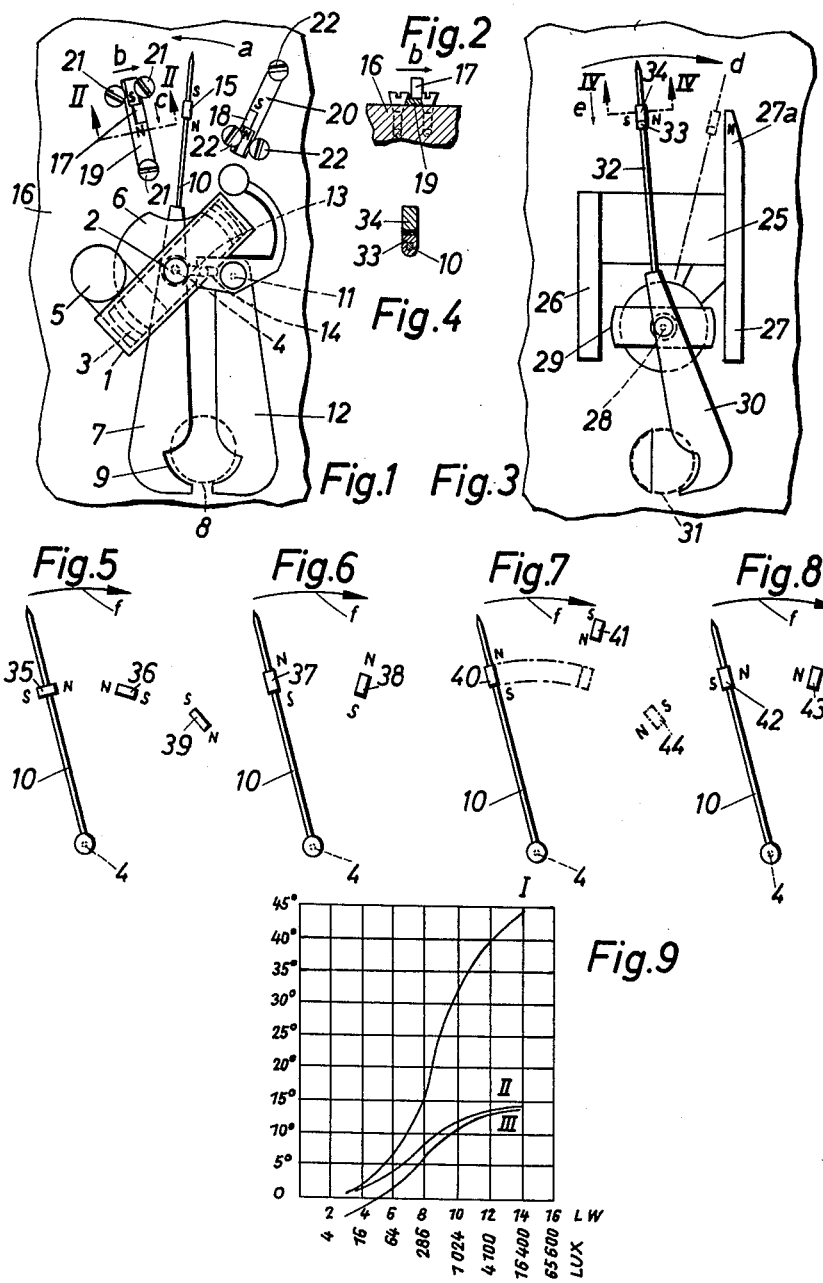

3,177,788
CONTROLS FOR ELECTRICAL INSTRUMENTS
Frederik Berthus Archibald Prinsen, Delft, Netherlands, assignor to Agfa Aktiengesellschaft, Leverkusen-Bayerwerk, Germany
Filed Jan. 17, 1961, Ser. No. 83,327
Claims priority, application Germany, Feb. 4, 1960, A 33,883
6 Claims. (Cl. 95—64)

The present invention relates to electrical instruments, and in particular to galvanometers of the type used in cameras or light meters for determining the setting of an element such as the diaphragm of a camera.

With instruments of this type it is difficult to adapt the movement of the pointer or rotor of the instrument to the particular requirements of the diaphragm. Thus, the galvanometer rotor turns as the light which reaches a photocell or the like connected to the galvanometer increases, and the rotor tends to turn through relatively large angles at the range where the light intensities are quite high. At this particular range, which is to say under conditions of high light intensity, the diaphragm opening is required to be quite small and only a small amount of movement is required to move the diaphragm from one position to the other at the range of high light intensities, and thus there is a problem in adapting the operation of the galvanometer which receives large currents at high light intensities to the operation of the diaphragm which must provide extremely small openings differing from each other by only small increments at the same high light intensities.

Attempts have already been made to solve this problem, and in particular the field of the galvanometer has been so arranged that as the current supplied from the photocell or the like increases the rotor turns into a magnetic field of the stator of the galvanometer which becomes increasingly weaker, so as to attempt to compensate in this way for the tendency of the galvanometer to turn at high light intensities through angles which are too large for suitable use with a diaphragm. However, this expedient does not provide a satisfactory solution inasmuch as even with such an arrangement it is seldom possible to reduce the movement of the galvanometer to the desired extent as a result of the relatively large currents which are supplied from the photocell or the like. Furthermore, because of the lack of uniformity in the magnetic field of such an arrangement there is the disadvantage that the rotor becomes unstable at its angular positions corresponding to the large light intensities, and as a result the galvanometer provides errors in balance which result in relatively large errors in the angular position of the rotor. Thus, because of these unavoidable errors in the range of high light intensity where the difference from one opening to the next of the diaphragm is quite small substantial errors in the setting of the diaphragm are encountered.

It is accordingly an object of the present invention to provide a solution to the above problem in a manner which does not require a non-uniform magnetic field and which does not give any inaccuracies resulting from instability in the rotor.

One of the objects of the present invention is to provide an exceedingly simple structure which will control the operation of the galvanometer so that at high light intensities the turning of the rotor thereof is accurately adapted to the operational requirements of a camera diaphragm.

A further object of the present invention is to provide a structure of the above type which can easily and conveniently be accurately adjusted so as to adapt the characteristic of the galvanometer to the particular characteristics of the camera diaphragm.

It is a still further object of the present invention to provide a structure which requires only a small amount of space so that it can be incorporated into galvanometers which form parts of cameras, for example, without substantial increase in the size of the camera.

With the above objects in view the invention includes, in a camera, light meter, or the like, a galvanometer having a rotor which is adapted to turn in response to changes in light intensity. The structure of the invention includes a first permanent magnet and means connecting the first permanent magnet to the rotor of the galvanometer for turning movement with this rotor. In addition, the structure of the invention includes a second permanent magnet and a means mounting this second permanent magnet with respect to the turning axis of the rotor at a location where the second permanent magnet cooperates with the first permanent magnet to influence the turning of the rotor, and of course these magnets cooperate to influence the rotary movement of the rotor in such a way as to adapt the galvanometer to the requirements of a camera diaphragm.

The novel features which are considered as characteristic for the invention are set forth in particular in the appended claims. The invention itself, however both as to its construction and its method of operation, together with additional objects and advantages thereof, will be best understood from the following description of specific embodiments when read in connection with the accompanying drawings, in which:

FIG. 1 shows in a partly diagrammatic manner one embodiment of a structure according to the present invention;

FIG. 2 is a fragmentary sectional view taken along line II—II of FIG. 1 in the direction of the arrows;

FIG. 3 illustrates, partly diagrammatically a further embodiment of the present invention;

FIG. 4 is a transverse sectional view taken along line IV—IV of FIG. 3 in the direction of the arrows;

FIGS. 5–8 illustrate diagrammatically other embodiments of the invention, respectively; and FIG. 9 is a graph illustrating how the invention compares with conventional arrangements.

Referring to FIG. 1, there is shown therein a galvanometer which includes a yoke 1 which is magnetic and which threadedly carries bearings 2 which support for rotation about the axis 4 the rotor 3 of the galvanometer. The yoke is fixed by the carrier 5 to the magnet 6 which also forms with the yoke 1 the stator of the galvanometer. The rotor 3 is connected with unillustrated, known return springs which act on the galvanometer rotor so as to yieldably maintain the same in the rest position indicated in FIG. 1 where no current flows through the rotor.

A blade 7 of a camera diaphragm is fixed with the rotor 3 so as to turn therewith about the rotor axis 4, and this blade 7 is formed with a substantially triangular notch 9 at a part of a blade 7 which extends across the diagrammatically illustrated objective 8. The rotor is connected at its side opposed to the blade 7 to an elongated rod 10 extending radially from the rotor and being turnable therewith, and the tip of the rod 10 can be used to indicate the angular position of the rotor so that the rod 10 can function as the pointer of the galvanometer, this tip of the rod 10 cooperating with an suitable, unillustrated scale so as to indicate to the user of the camera the particular setting of the diaphragm.

The wall 16 which is fragmentarily indicated in FIG. 1 carries a pivot 11 on which a second blade 12 of the diaphragm is turnable. In order to turn the blade 12 the blade 7 fixedly carries next to the axis 4 of the rotor a lever 13 which extends into an elongated camming cutout formed in a member connected to the blade 12, this cutout being shown at 14, and the parts cooperate so that the blade 12 will always turn equally and oppositely to the blade 7 so as to regulate the size of the exposure aperture of the camera.

The elongated rod 10 carries a permanent magnet 15. The wall 16 which carries all of the structure shown in FIG. 1, carries also a pair of additional permanent magnets 17 and 18 which are located so as to influence the operation of the galvanometer in cooperation with the magnet 15. Thus, the magnets 17 and 18 are mounted at locations where they cooperate with the magnet 15 so as to influence the manner in which the rotor 3 turns. In the embodiment of FIG. 1 the permanent magnets 17 and 18 are located at approximately the same radial distance from the axis 4 as the magnet 15, and this magnet 15 as well as the rod 10 function additionally as a counterbalance for the diaphragm blade 7.

The mounting means which mounts the permanent magnets 17 and 18 includes a pair of carriers 19 and 20 to which the permanent magnets 17 and 18 are respectively fixed. Each carrier 19 and 20 is fixed to the wall 16 by screws, and thus the three screws 21 serve to fix the carrier 19 to the wall 16, while the three screws 22 serve to fix the carrier 20 to the wall 16. As is shown in FIG. 2 each of the screws has a frustoconical head which engages the carrier. Thus, the side edges of the carrier 19 are in engagement with the pair of upper screws 21 shown in FIG. 1 while the lower end of the carrier 19 engages the lower screw 21, and the carrier 20 is arranged in the same way with respect to the screws 22 except that the upper end of the carrier 20 engages a screw 22 while the side edges of the carrier 20 have lower end portions in engagement with the pair of screws 22 shown below the upper screw 22 in FIG. 1. The ends and side edges of the carriers which engage the screws are inclined to the same extent as the frustoconical heads, and thus it is possible by turning these screws in the threaded bores of the plate 16 which respectively receive these screws to adjust the carriers 19 and 20 both radially with respect to the axis 4 as well as angularly with respect thereto, and in this way it is possible to adjust the position of the carrier 19 and the magnet 17 carried thereby in the direction of the arrows b and c of FIG. 1, and the carrier 20 can be adjusted in the same way by the screws 22. Of course, these carriers such as the carrier 19 can be adjusted either in the direction of the arrows b and c in opposite directions.

The magnet 15 is arranged in the particular example illustrated in FIG. 1 so that its north pole is directed toward the axis of the rotor, and the magnets 17 and 18 also have their north poles directed toward the axis of the galvanometer rotor.

In the rest position the parts are as illustrated in FIG. 1. In this position the magnets 17 and 18 exert in cooperation with the magnet 15 equal and oppositely directed repulsive forces which serve to maintain the rotor 3 in the illustrated rest position where no current flows therethrough. When light falls on the photocell or the like so as to supply current to the rotor 3, and the amount of current depends, of course, on the light intensity, then the rotor 3 will turn in opposition to the above-mentioned unillustrated return springs in the direction of the arrow a. Thus, the magnet 15 will move to an increasing extent beyond the field of the stationary magnet 18 and closer to the field of the magnet 17 which therefore repels the magnet 15 with an increasing force as the magnet 15 comes closer to the magnet 17, and as a result the magnets 15 and 17 cooperate to oppose the turning of the rotor and thus reduce the extent to which the rotor turns particularly at a range of high light intensities.

The force of repulsion between the magnets 15 and 17, which is always substantially smaller than the force which tends to turn the rotor in the direction of the arrow a of FIG. 1, increases as the distance between the magnets 15 and 17 decreases. Thus, the turning of the rotor 3 will be braked in the range of high light intensities so that for given changes in light intensity the rotor 3 will turn through angles smaller than the angles through which the rotor of a conventional galvanometer would turn under the same conditions. In this way it is possible to adapt the operating characteristics of the galvanometer over a large range of light intensities to particular requirements of a particular diaphragm.

In the rest position shown in FIG. 1, the magnet 18 serves to cancel out the influence of the magnet 17 on the magnet 15 so that the magnet remains in the very same position which it would have in its position of rest if none of the magnets were provided.

The embodiment of the invention which is illustrated in FIG. 3 includes a galvanometer whose stator is formed by an outer magnet 25 connected with a pair of pole shoes 26 and 27 between which the rotor 29 is supported for rotary movement about the axis 28, and the rotor is fixed with a diaphragm blade 30 which extends across the objective 31 so as to control the exposure aperture.

Fixed to the diaphragm blade 30 is an elongated rod 32 which turns with the rotor and which, if desired, may be formed by an extension of the blade 30. A holder 33 is mounted on the rod 32 for frictional movement therealong with a resistance sufficient to retain the holder 33 in the position along the rod 32 in which it happens to be set by the operator, and this holder 33 carries a permanent magnet 34 which in the embodiment of FIG. 3 cooperates with a second magnet 27a formed by an extension of the pole shoe 27. The extension 27a forms, for example, a north pole and the polarity of the magnet 34 is such that its north pole is directed toward the north pole at the extension 27a of the pole shoe 27.

With the embodiment of FIG. 3 when the photocell or the like which is connected electrically to the galvanometer supplies current to the rotor thereof, the rotor will turn in the direction of the arrow d so that the magnet 34 will approach the end 27a of the pole shoe 27. Because the north poles of the permanent magnets of FIG. 3 are directed toward each other there is a force of repulsion between the magnet 34 and the magnet 27a, and thus the magnetic force tends to resist turning of the rotor in the direction of the arrow d. In this way the extent to which the rotor turns from one light value to the next at the range of high light intensities is continuously reduced.

Because the holder 33 can be shifted along the rod 32 so as to adjust the position of the magnet 34, in the direction of the arrow e or in the opposite direction, it is possible to control the cooperation between the magnets 34 and 27a so as to adapt the galvanometer operation to the required operation of the camera diaphragm.

In the embodiment which is diagrammatically illustrated in FIG. 5, a permanent magnet 36 is fixedly mounted adjacent the area in which the rod 10 is located at high light intensities, this rod 10 corresponding, for example, to the rod 10 of FIG. 1 and being turnable about the axis 4 with the galvanometer rotor. The rod 10 in this embodiment carries a magnet 35, and the magnets 35 and 36 are so arranged that like poles are directed toward each other. The rod 10 turns in the direction of the arrow f of FIG. 5 as the light intensity increases, and thus as the light intensity increases the magnets 35 and 36 will be located closer and closer together so that from one light value to the next the angular turning of the galvanometer rotor is reduced with the structure of FIG. 5.

In the embodiment of FIG. 6 the rod 10 which is fixed to the galvanometer for rotary movement therewith and which forms part of an assembly such as that shown in FIG. 1 carries the permanent magnet 37. The rod 10 turns with the rotor from the rest position indicated in FIG. 6 in the direction of the arrow f of FIG. 6. When turning in this direction the magnet 37 will approach a fixedly mounted magnet 38 which is arranged at the end of the path of movement of the magnet 37 as light intensities increase, and the magnets 37 and 38 are so arranged that their like poles are aligned with and directed toward each other and in the particular arrangement shown both of the south poles of the magnets 37 and 38 are directed toward the axis 4 of the rotor. The embodiment of FIG. 6 includes in addition a magnet 39 which is also a permanent magnet and which is arranged on the other side of the magnet 37 from the magnet 38, and this magnet 39 is so positioned that its north pole is directed toward the axis. The magnet 39 thus attracts the magnet 37 and these magnets 37 and 39 engage each other to locate the rod 10 of FIG. 6 in its rest position where no current flows through the galvanometer. Thus, with this embodiment in addition to reducing the angular increments of turning of the rotor at the region of high light intensities the magnets 37 and 39 operate to control and influence the operation of the rotor in the region of low light intensities so that in this latter region the required movement of the blades of the galvanometer can be obtained without resorting to any other measures.

In the embodiment of the invention which is illustrated in FIG. 7, the rod 10 carries a permanent magnet 40 which cooperates with the stationary magnet 41. This magnet 41 is not located in the path of turning of the magnet 40. It is located adjacent the path of turning of the magnet 40 but at a radial distance from the axis 4 which is equal to the distance of the magnet 40 from the axis 4 plus approximately the length of the magnet 40. The polarity of the magnets 40 and 41 is such that like poles of these magnets are closer to each other than unlike poles thereof and also it will be seen that unlike poles of the magnets 40 and 41 are directed toward the axis 4. Inasmuch as the magnets 40 and 41 are located at different distances from the axis 4 the like poles, which are the north poles in the particular example illustrated in FIG. 7, cooperate to again provide a repulsive force opposing the rotary movement of the rotor at the region of high light intensities, but it will be noted that with the arrangement of FIG. 7 the repulsive force is less than that of the other embodiments so that the extent to which the angular turning of the rotor at high light intensities is decreased is less with the embodiment of FIG. 7 and with the above-described embodiments.

Of course, the structures shown in FIGS. 5 and 7 may be provided with additional magnets arranged on the other side of the magnets 35 and 40 from the magnets 36 and 41, respectively, so as to cooperate with the magnets 35 and 40 at the start of the movement of the rotor, in a manner similar to the cooperation of the magnets 37 and 39.

With the embodiment of the invention illustrated in FIG. 8 the rod 10 carries the permanent magnet 42 and a pair of magnets 43 and 44 are provided on opposite sides of the magnet 42 in the manner shown diagrammatically in FIG. 8. All of these magnets 42–44 are oxide magnets which have between their poles a length shorter than the dimension of each of these magnets in a direction perpendicularly to this length. The polarity is such that the magnets 43 and 44 repel the magnet 42. Thus, like poles of the pair of cooperating magnets are directed toward each other. Thus, in the position of FIG. 8 the repulsive forces are equal and opposite to each other and maintain the rod 10 in its rest position where no current flows through the galvanometer. The magnets 42 and 43 will cooperate when the rod 10 turns in the direction of the arrow *f* of FIG. 8 in the same way that magnets 15 and 17 of FIG. 1 cooperate when the rod 10 of FIG. 1 turns in the direction of the arrow *a*.

FIG. 9 illustrates the relationship between the angular turning of the rotor of the galvanometer and the intensity of the light which reaches the photocell or the like which actuates the rotor of the galvanometer. The light intensity is shown in FIG. 9 along the abscissa in two scales of values, the upper scale being a scale of light values with respect to a film speed of 18° DIN, while the lower scale is a scale of the light intensity in LUX. The ordinate has the degrees of turning of the rotor of the galvanometer. The curve I shows the manner in which a conventional galvanometer rotor adapted to be used with an automatic diaphragm adjustment of the camera is used, in a galvanometer where the correction of the operation of the galvanometer is brought about by the particular configuration of the pole shoe. Curve II illustrates the manner in which a galvanometer provided with the magnet arrangement of the invention operates, this curve II showing the operation of a galvanometer where only a single stationary magnet is located at that side of the magnet carried by the rod 10 or 32 toward which this latter magnet turns with the rotor during increasing light intensities. The curve III illustrates the additional effect which is obtained by adding the third magnet arranged at the side of the movable magnet toward which the latter turns when approaching its rest position, this third magnet being of the type shown in FIG. 6 which attracts the movable magnet toward its rest position. Thus, although FIGS. 1 and 8 show a third magnet, in these embodiments the third magnets repel so as to determine the rest position of the rotor, and these embodiments operate as indicated at curve II. Curve III shows the additional effect obtained from a permanent magnet which attracts the movable magnet to its rest position.

Of course the invention is not limited to a galvanometer arrangement used to regulate a diaphragm. The structure of the invention also can be used for example, with those light measuring devices which automatically operate the camera so as to set both the exposure and the exposure aperture thereof, and of course the structure of the invention is also capable of being used in separate hand light meters which do not form part of the camera.

It will be understood that each of the elements described above, or two or more together, may also find a useful application in other types of electrical instruments differing from the types described above.

While the invention has been illustrated and described as embodied in controls for electrical instruments, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in cameras, light meters, and the like, in combination, a galvanometer having a rotor adapted to turn in response to changes in light intensity and having an elongated pointer fixed to and extending radially from said rotor for turning movement therewith; a first permanent magnet carried by said pointer at a distance from the turning axis of said rotor so that said first permanent magnet turns with said pointer through a substantial distance when said rotor turns; a second permanent magnet; and means mounting said second permanent magnet substantially in the region of the path of turning of said first permanent magnet when the latter turns with said pointer during an increase in light intensity so that during rotation of said rotor when the light intensity increases said first permanent magnet approaches said second permanent magnet, and said magnets respectively having like poles directed toward each other so that said magnets cooperate to reduce the extent to which said rotor turns during increases in light intensity.

2. The combination of claim 1 and wherein said rotor has a rest position, and a third permanent magnet located on the side of said first permanent magnet opposite from said second permanent magnet, said second and third permanent magnets being respectively located in positions and having polarities which produce equal and opposite repulsive forces on said first magnet when said rotor is in said rest position.

3. The combination of claim 1 and wherein said first and second magnets are located at the same radial distance from the turning axis of said rotor.

4. The combination of claim 1 and wherein said first and second magnets each has opposite poles spaced from each other in the direction of turning of said rotor substantially circumferentially with respect to the axis of said rotor.

5. The combination of claim 1 and wherein said magnets are radially arranged with respect to the axis of the rotor.

6. For use in cameras, in combination, a galvanometer having a rotor adapted to turn in response to changes in light intensity and having an elongated pointer fixed to and extending radially from said rotor for turning movement therewith; a first permanent magnet carried by said pointer at a substantial distance from the turning axis of said rotor so that said first permanent magnet turns with said pointer through a substantial distance even when said rotor turns through a relatively small angle; a second permanent magnet; means mounting said second permanent magnet substantially in the path of turning of said first permanent magnet when the latter turns with said pointer during an increase in light intensity so that during rotation of said rotor when the light intensity increases said first permanent magnet approaches said second permanent magnet, and said magnets respectively having like poles directed toward each other so that said magnets cooperate to reduce the extent to which said rotor turns during increases in light intensity; and a diaphragm blade also fixed to said rotor for turning movement therewith and cooperating with an objective of the camera to participate in the control of the exposure aperture through said objective, said diaphragm blade extending from said rotor in a direction substantially opposed to the direction in which said pointer extends.

References Cited in the file of this patent
UNITED STATES PATENTS

| | | |
|---|---|---|
| 1,933,327 | Hoare | Oct. 31, 1933 |
| 2,013,362 | Riszdorfer | Sept. 3, 1935 |
| 2,755,444 | Pfeffer | July 17, 1956 |
| 2,817,816 | Medlar | Dec. 24, 1957 |
| 2,960,003 | Hahn | Nov. 15, 1960 |